US005217775A

United States Patent [19]

v. Wedekind

[11] Patent Number: 5,217,775

[45] Date of Patent: Jun. 8, 1993

[54] DISPATCH GOODS LABEL AND PROCESS FOR MAKING IT

[75] Inventor: Oscar v. Wedekind, Garbsen, Fed. Rep. of Germany

[73] Assignee: Security Label GmbH, Witzhave, Fed. Rep. of Germany

[21] Appl. No.: 716,402

[22] Filed: Jun. 17, 1991

[30] Foreign Application Priority Data

Jul. 26, 1990 [DE] Fed. Rep. of Germany ....... 4023803

[51] Int. Cl.[5] .......................... B32B 3/10; B32B 7/06; B32B 7/14

[52] U.S. Cl. ....................................... 428/42; 428/40; 428/41; 428/43; 428/77; 428/78; 428/202; 40/299; 283/81

[58] Field of Search ....................... 428/43, 40, 41, 77, 428/78, 42, 202; 283/81; 40/299

[56] References Cited

U.S. PATENT DOCUMENTS 4,666,185 5/1987 Pilborough .......................... 283/81
4,882,861 11/1989 Holmes et al. ....................... 40/299

*Primary Examiner*—Alexander S. Thomas
*Attorney, Agent, or Firm*—Michael J. DeSha

[57] ABSTRACT

A dispatch goods label consists of a loop section and an adjoining section which are both detachably connected with one another via a perforation. A respective adhesive layer of the loop section and the adjoining section ends at a distance from the perforation line. Both of the ends of the covering strip are uncoated and adhere directly to the respectively opposing adhesive layer of the loop section and the adjoining section. They are foldable at the transition to the respective adhesive layer about the transition line. The covering tape is provided at the level of the perforation line of the loop section and the adjoining section with a cut line connection which brakes open upon folding both sections about the perforation line.

3 Claims, 1 Drawing Sheet

DISPATCH GOODS LABEL AND PROCESS FOR MAKING IT

The invention relates to a dispatch goods label consisting of a loop section and an adjoining section separated by a perforation line, wherein said loop section and said adjoining section are detachable from each other, the loop section and the adjoining section being provided with an adhesive layer in the region of the perforation to which a coated covering tape detachably adheres. Additionally, the invention relates to a process for making tape-like dispatch goods labels out of dispatch goods label webs.

Known dispatch goods label webs, in particular baggage tape tags which are also divided into a loop section and an adjoining section, have stripping foils on the rear side in the perforation region which are provided with a silicone coating. Following removal of the respective stripping foil, and adhesive layer is exposed which has the width of a baggage tape tag. This adhesive layer is present both on the loop section of the baggage tape tag as well as on the adjoining section which as a rule is applied onto the travelling ticket. The free end is applied onto the adhesive surface of the loop section and stuck to this.

It is an object of the invention to provide a dispatch goods label of the type initially mentioned and a process for the making thereof with which no pieces of waste ensue, wherein the adhesive surface of the loop section and the adjoining section should additionally be exposable in a simple manner.

The object is solved in accordance with the invention in that the adhesive layer of the loop section and the adjoining section ends at a distance from the perforation line, that both ends of the covering tape are uncoated and adhere directly to the opposing adhesive layer of the loop section and the adjoining section as well as being foldable at the transition to the respective adhesive layer at the transition line, and that the covering tape is provided at the perforation line of the loop section and the adjoining section with a cut line which breaks open upon folding both sections.

This object is additionally solved in that a composite tape, consisting of a covering tape provided with a cut line, of two silicone coatings spaced from the cut line and the edges of the covering tape which lie opposite the cut line and of self-adhesive coatings covering both of the silicone coatings and both of the edge regions free of silicone coating, is applied per respective dispatch goods label on the rear side of the already printed dispatch goods label web in the longitudinal direction of the same in such a manner that the perforation line of the dispatch goods label and the cut line of the composite tape overlap.

With a dispatch goods label of this kind, the advantage ensues that in folding the adjoining section or the loop section about the perforation line, a cut line connection separating both sections of the covering tape breaks open. After the breaking open of both of the covering tape sections, these can be folded about the respective transition edge between the coated and the uncoated region of the covering tape in a simple manner. The folded regions of the covering tape remain stabily and in a simple manner in the folded position so that the adhesive region of the loop section and the adhesive region of the adjoining section are exposed and remain so. Thus, the free end of the loop section can be forced against the adhesive surface and adhered to this. The adjoining section can be applied to the travelling ticket in a simple manner. Waste does not arise with this.

In accordance with an advantageous embodiment, the adhesive coating of the loop section and the adjoining section ends at a distance from both longitudinal edges of the sections. Thus, the advantage ensues that for the loop end not being applied exactly onto the exposed adhesive coating, no adhesive surface is exposed to which disadvantageously and in an undesirable manner other parts such as dust, for example, can otherwise adhere.

BRIEF DESCRIPTION OF DRAWINGS

In the following, the invention is described with respect to an exemplified embodiment depicted in FIGS. 1 to 3, in which.

Figure 1:
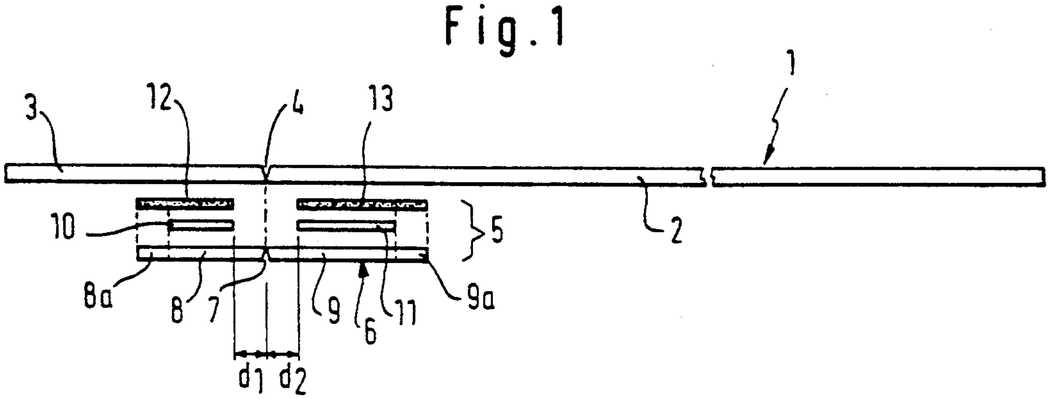
FIG. 1 shows a schematic side view of a baggage tape tag.
Figure 2:
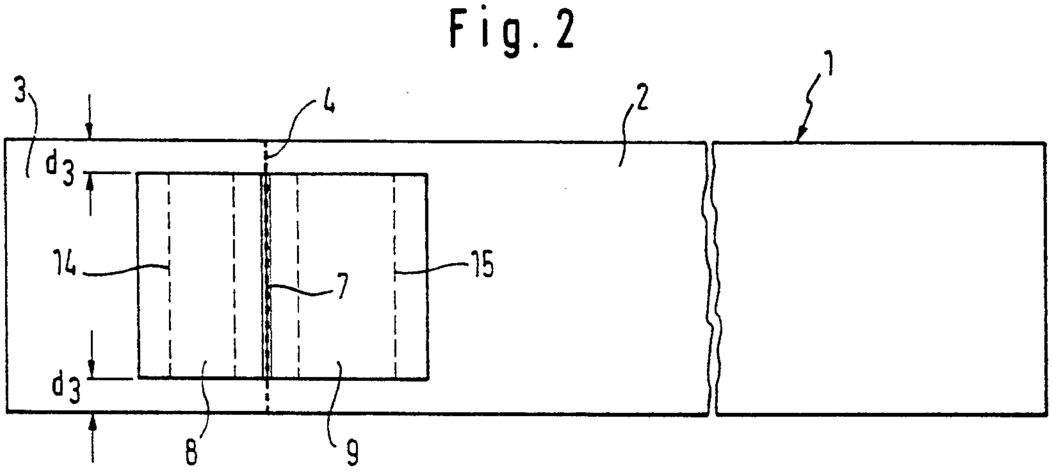
FIG. 2 shows a view from below of a baggage tape tag prior to use.

According to FIGS. 1 to 3, 1 denotes a baggage tape tag which has a main baggage tape section 2 denoted "loop section" in the following, and an adjoining section 3 denoted "identification section" in the following. The loop section 2 and the identification section 3 are connected to each other at a perforated line 4. A composite tape 5 consists of a covering tape 6 which is divided by a cut line 7 into a first section 8 and a second section 9. The perforation line 4 and the cut line 7 lie over one another. At a respective distance d1 and d2 from the perforation line 4 and the cut line 7, a silicone coat 10 is located on the identification section side and a silicone coat 11 on the loop section side. Both silicone coats 10 and 11 leave blank an uncoated edge strip on the covering tape 6. Both edge tapes from the width 8*a* and 9*a* and both silicone coats 10 and 11 are respectively covered by an adhesive layer 12 and 13. The composite tape 5 is respectively applied to the underside of the baggage tape tag such that a space d3 remains respectively at the longitudinal edges.

For use, the identification section and the loop section are folded about the perforation line 4 in such a manner that both upper sides face one another. With this, the cut line connection of the composite tape is separated. The use of the baggage tape tag can then fold both of the covering tape regions about the transition edge between the silicone coating and the uncoated area. These folding transition lines are denoted 14 and 15.

Figure 3:
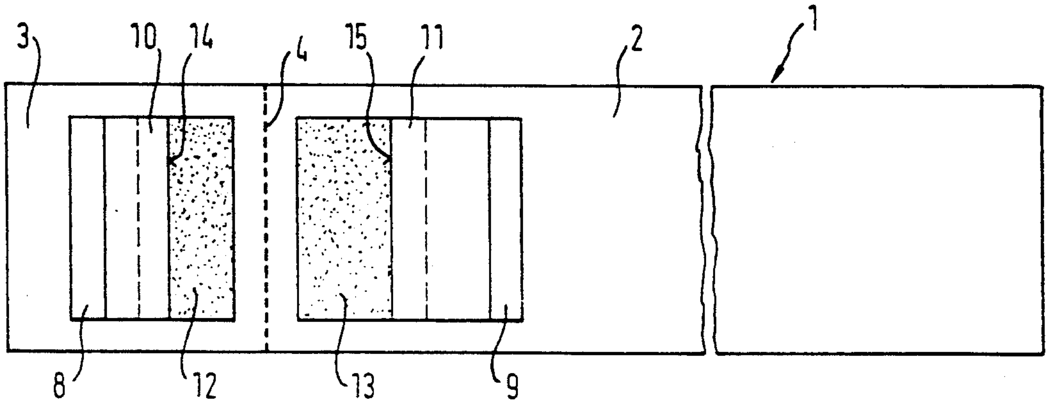
FIG. 3 shows the underside of a baggage tape tag with exposed adhesive surfaces.

According to FIG. 3, both of these covering tape regions are folded and the adhesive surfaces 12 and 13 are exposed. The free end of the loop section is then connected with the adhesive surface 13, and the identification section 3 is separated and connected with the travelling ticket via its adhesive surface 12.

Advantageously, no pieces of waste ensue. The handling is conceivably simple.

I claim:

1. Dispatch goods label comprising a loop section and an adjoining section separated by a perforation line, wherein said loop section and said adjoining section are detachable from each other, the loop section and the adjoining section being provided with an adhesive layer in the region of the perforation line to which a coated covering detachably adheres, and wherein the adhesive layer of the loop section and the adjoining section ends at a distance from from the perforation line, both ends of the coated covering tape are uncoated and adhere directly to the opposing adhesive layer of the loop section and the adjoining section and said covering tape being foldable at a transition line between the coated area adhering at the respective adhesive layer and said uncoated area, and the covering tape is provided at the location of the perforation line of the loop section and the adjoining section with a cut line which breaks open upon folding both sections.

2. Dispatch goods label according to claim 1, wherein the adhesive layers of the loop section and the adjoining section both end at a distance from opposite edges of said dispatch goods label extending in a longitudinal direction.

3. Process for making tape-like dispatch goods labels out of a dispatch goods label web which are provided with a cross-perforation line to divide each respective dispatch label into a loop section and a detachable adjoining section including the steps of providing a composite tape comprising a covering tape provided with a cut line and having two silicone coatings spaced from the cut line and from the edges of the covering tape which lie opposite the cut line and having self-adhesive coatings covering both of the silicone coatings and both of the edge regions of the covering tape being free of silicone coating, and applying the composite tape per respective dispatch goods label on a rear side of the dispatch goods label web in a longitudinal direction of the same in such manner that the perforation line of the dispatch goods label and the cut line of the composite tape overlap.

* * * * *